Patented Oct. 9, 1945

2,386,447

UNITED STATES PATENT OFFICE 2,386,447

RUBBERLIKE COPOLYMERS AND METHOD OF MAKING SAME

Robert R. Dreisbach, Midland, Mich., assignor to The Dow Chemical Company, Midland, Mich., a corporation of Michigan No Drawing. Application July 11, 1940, Serial No. 344,958

14 Claims. (Cl. 260—66)

This invention concerns certain new rubberlike co-polymers of conjugated diolefines and unsaturated ketones which are superior in several important respects to those heretofore known. It particularly concerns certain new co-polymers of butadiene-1.3 and methyl isopropenyl ketone.

U. S. Patent No. 1,901,354 discloses rubberlike co-polymers of butadiene hydrocarbons with minor proportions of unsaturated ketones, e. g. methyl isopropenyl ketone. The products of the patent are prepared by heating a mixture of a butadiene hydrocarbon and an unsaturated ketone, which mixture contains only between 5 and 50 per cent by weight of the ketone.

The rubber-like products of the present invention are co-polymers of a minor proportion of a conjugated diolefine with a major proportion of an unsaturated ketone.

I have found that under otherwise similar polymerizing conditions a mixture of a conjugated aliphatic diolefine and an unsaturated ketone, containing between 55 and 70 per cent by weight of the ketone, polymerizes more rapidly and completely than does a mixture of the same ingredients which contains the ketone in proportions outside of the limits just stated. I have also found that the rubber-like products obtained by co-polymerizing a conjugated diolefine and a major proportion of an unsaturated ketone in the proportions just given, when compounded with usual rubber-compounding agents and vulcanized, possess greater elasticity, tensile strength and are more tough than the products obtained by co-polymerizing a mixture of the same ingredients in other proportions and compounding and vulcanizing the products under otherwise similar conditions.

In making the new products, either butadiene-1.3 or isoprene is preferably used as the diolefine reactant, but other conjugated diolefinic compounds such as 2-ethyl-butadiene, 2.3-dimethylbutadiene, 2-chloro-butadiene, etc., or a mixture of such diolefinic compounds, may be employed. The unsaturated ketone reactant is one having the general formula:

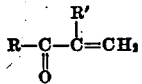

whereby R represents an alkyl or an aromatic radical and R' represents hydrogen or an alkyl radical. Examples of such unsaturated ketones are methyl isopropenyl ketone, methyl vinyl ketone, methyl alpha-ethyl-vinyl ketone, ethyl alpha-ethyl-vinyl ketone, isopropyl isopropenyl ketone, phenyl vinyl ketone, etc. Methyl isopropenyl ketone is preferred.

The polymerization may be carried out by simple heating of a mixture of the diolefine and unsaturated ketone containing between 55 and 70 per cent, preferably between 58 and 63 per cent, of the latter, but a polymerization accelerator, e. g. sodium or potassium, benzoyl peroxide, hydrogen peroxide, sodium or potassium perborate, etc., is preferably used in small proportion to promote the reaction.

In practice, the reactants in the proportions just given are preferably emulsified with water and the compounds are co-polymerized while in the emulsion. Any of a wide variety of emulsifying agents, e. g. egg albumen, soaps, alkali metal sulphonates of aliphatic and alkyl-aromatic hydrocarbons of high molecular weight, etc., may be used in forming the emulsion. The emulsion is usually prepared so as to contain 30 per cent by weight or more of the ingredients to be co-polymerized, but it may contain said ingredients in lower concentrations, if desired. The emulsifying agent is, of course, used in the proportion necessary to form a stable emulsion, the proportion required being dependent upon the agent employed and the kind and concentration of the reactants. Usually, the employment of from 1 to 5 per cent by weight of a sulphonate type of emulsifying agent suffices to form a stable emulsion.

A polymerization promoter may advantageously be incorporated in the emulsion. As such promoter I preferably employ a highly chlorinated hypdrocarbon such as hexachloroethane, pentachlorbethane, octachloropropane, hexachlorobenzene, methyl-pentachlorobenzene, ethyl-pentachlorobenzene, diethyl-tetrachlorobenzene, etc., or a mixture of such chlorinated hydrocarbon and another polymerization catalyst, e. g. a peroxide such as hydrogen peroxide, benzoyl peroxide, sodium or potassium perborate, etc. The polymerization promoter is usually employed in amount corresponding to between 0.1 and 1.0 per cent of the combined weight of the diolefine and the unsaturated ketone, but it may be employed in smaller or larger proportions.

The emulsion is heated, e. g. in a closed container at temperatures between 40° and 100° C. and preferably between 50° and 70° C., to effect the co-polymerization. During heating, the emulsion may advantageously be exposed to actinic light rich in wave lengths between 3000 and 6000 angstrom units, which light, I have found, accelerates the reaction and favors the formation of a co-polymer of good quality.

After completing the polymerization, the co-polymer is recovered from the emulsion. In some instances, the recovery may satisfactorily be effected by coagulation of the co-polymer, e. g. by heating or by adding a coagulating agent such as a mineral acid, sodium chloride, or calcium chloride, etc. Frequently, however, the emulsion of the co-polymer is sufficiently stable so that complete separation of the product by coagulation is difficult to attain. In practice, the product is preferably recovered by evaporating water from the emulsion, preferably under vacuum, until the product is completely precipitated or remains as a residue. The product is dried, preferably under vacuum at temperatures below 100° C.

The co-polymerization product may readily be rolled, milled and/or compounded with usual rubber compounding agents, e. g. carbon black, fillers, antioxidants, accelerators, vulcanizers, etc. When vulcanized it is obtained as a rubber-like material having excellent elasticity, tensile strength, toughness, and good resistance to abrasion. It is practically insoluble in usual organic solvents, e. g. benzene, toluene, gasoline, mineral lubricating oil, carbon tetrachloride, ethylene chloride, etc., and is swelled by such solvents to less extent than is similarly vulcanized natural rubber.

The following examples describe a number of ways in which the principle of the invention has been applied and illustrate certain of its advantages, but they are not to be construed as limiting its scope.

EXAMPLE 1

The purpose of this example is to demonstrate certain of the advantages obtained by co-polymerizing a mixture of a diolefine and an unsaturated hydrocarbon which contains between 55 and 70 per cent by weight of the latter, instead of co-polymerizing a mixture of the same ingredients in other proportions. In each of a series of experiments, approximately 0.08 gram of hexachloroethane and 8 grams of a mixture of butadiene-1.3 and methyl isopropenyl ketone were added to 10 cubic centimeters of an aqueous solution containing 3.5 per cent by weight of Turkey red oil (sulphonated castor oil) and 1 per cent of Dreft (a mixture of sodium sulphate and sodium salts of higher mono-alkyl sulphates), which solution had been brought to a pH value of 8 with dilute sodium hydroxide. The mixture was agitated to effect emulsification and then was heated with continued agitation at 60° C. under exposure to actinic light for 3 days to effect polymerization. The light employed was light from a mercury vapor arc lamp, which had been passed through a light-filter to remove most of the light of wave lengths less than 3000 angstrom units. After completing the polymerization, water was evaporated from the emulsion at about 70° C. The residual rubbery material was heated to 100° C. under vacuum, i. e. at a final pressure of about 20 millimeters, to vaporize moisture and unreacted material therefrom. The product was treated with 50 per cent of its weight of carbon black, 10 per cent of zinc oxide, 3 per cent of sulphur, 2 per cent of pine tar, 2 per cent of rosin and 0.1 per cent of mercapto-thiazole and the mixture was compounded, rolled into a sheet and cured by heating under pressure to 148° C. for 20 minutes. Standard test strips were then cut from the sheet and were used in determining the tensile strength and the per cent ultimate elongation of the material in accordance with directions given in A. S. T. M. D 412-39T. The following table gives the per cent by weight of butadiene and of methyl isopropenyl ketone employed, based upon the combined weight of said compounds and the per cent yield of devolatilized rubbery co-polymer, based upon the combined weight of butadiene and methyl isopropenyl ketone employed. It also gives the tensile strength in pounds per square inch of cross section and the per cent elongation properties of the compounded and cured product. Figures indicating the relative toughness of the compounded and cured products are also included. The toughness value given for each sample is the product of the per cent elongation and the tensile strength values.

Table I

| Run No. | Butadiene, percent | Methyl isopropenyl ketone, percent | Yield, percent | Properties of cured products | | |
|---|---|---|---|---|---|---|
| | | | | Tensile strength, lbs./sq.in. | Elongation, percent | Toughness |
| 1 | 100 | 0 | 88 | 990 | 100 | 99,000 |
| 2 | 90 | 10 | 80 | 1,020 | 150 | 153,000 |
| 3 | 80 | 20 | 93 | 1,150 | 150 | 172,500 |
| 4 | 60 | 40 | 90 | 2,100 | 220 | 462,000 |
| 5 | 40 | 60 | 96.5 | 3,000 | 320 | 960,000 |
| 6 | 20 | 80 | 74.7 | 1,475 | 300 | 442,500 |
| 7 | 0 | 100 | 47.4 | 200 | 300 | 60,000 |

From the above data it will be seen that the mixture of butadiene and methyl isopropenyl ketone which contains 60 per cent of the latter polymerizes more readily and produces a rubbery product of far greater strength, elongation and toughness than do the mixtures containing the same ingredients, but in other proportions.

EXAMPLE 2

A series of tests similar to those described in Example 1 were carried out, except that in each of these tests the water used in forming the initial emulsion contained 2 per cent by weight of benzoyl peroxide as the polymerization catalyst. Table II gives the proportions of butadiene and methyl isopropenyl ketone employed, the yields of the rubbery co-polymers and the tensile strength, per cent elongation and toughness values determined for the products after they had been compounded and cured as in Example 1. Certain of the compounded and cured products were too brittle for testing.

Table II

| Run No. | Reactants | | Yield, percent | Properties of cured products | | |
|---|---|---|---|---|---|---|
| | Butadiene, percent | Methyl isopropenyl ketone, percent | | Tensile strength, lbs./sq. in. | Elongation, percent | Toughness |
| 1 | 100 | 0 | 91.7 | 750 | About 240 | About 180,000 |
| 2 | 80 | 20 | 100 | 1,000 | 250 | 250,000 |
| 3 | 60 | 40 | 100 | 2,150 | 270 | 580,500 |
| 4 | 50 | 50 | 94.3 | 3,070 | 300 | 921,000 |
| 5 | 40 | 60 | 100 | 2,770 | 365 | 1,011,050 |
| 6 | 20 | 80 | 100 | Too brittle for testing | | |
| 7 | 10 | 90 | 98.7 | Too brittle for testing | | |

I have also co-polymerized other mixtures of diolefines and unsaturated ketones, e. g. mixtures of butadiene and vinyl n-propyl ketone, mixtures of isoprene and methyl isopropenyl ketone and mixtures of butadiene, isoprene, and methyl isopropenyl ketone to obtain rubber-like co-polymers. In all instances the mixtures of said reactants which contained between 55 and 70 per cent of the unsaturated ketone reactant were readily co-polymerized to obtain rubber-like products of good quality.

Although the invention is limited to the preparation of rubbery products by the co-polymerization of mixtures of diolefines and unsaturated ketones containing between 55 and 70 per cent of the latter, it does not require the absence of other polymerizable compounds from the mixtures. Frequently one or more other polymerizable compounds, e. g. linseed oil, China-wood oil, oiticica oil, styrene, divinyl benzene, vinyl cyanide, etc., may advantageously be added to the initial reaction mixture for the purpose of modifying the solubility characteristics or the physical or mechanical properties of the rubbery products. Such other polymerizable compound is usually employed in amount not exceeding 10 per cent and preferably less than 5 per cent of the combined weight of the diolefine and unsaturated ketone.

Other modes of applying the principle of the invention may be employed instead of those explained, change being made as regards the products herein disclosed, provided the compound or compounds stated by any of the following claims or the equivalent of such stated compound or compounds be employed.

I therefore particularly point out and distinctly claim as my invention:

1. A rubber-like material comprising as the essential ingredient a co-polymer of at least two polymerizable organic compounds including, first, a diolefinic compound selected from the class consisting of aliphatic conjugated diolefines and 2-chloro-butadiene-1.3, and, secondly, an unsaturated ketone having the general formula:

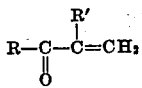

wherein R represents a radical selected from the class consisting of alkyl and aryl radicals and R' represents a member of the group consisting of hydrogen and alkyl radicals, which polymerizable organic compounds are chemically combined in proportions such that the ketone corresponds to between 58 and 63 per cent of the combined weight of said diolefinic compound and ketone.

2. A rubber-like co-polymer obtained by polymerizing a mixture of unsaturated organic compounds, which mixture consists substantially of a conjugated diolefine and an unsaturated ketone having the general formula:

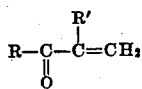

wherein R represents a radical selected from the class consisting of alkyl and aryl radicals and R' represents a member of the group consisting of hydrogen and alkyl radicals, said unsaturated ketone being employed in a proportion corresponding to between 58 and 63 per cent of the combined weight of the diolefine and said ketone.

3. A rubber-like co-polymer of a conjugated diolefine and an unsaturated ketone having the general formula:

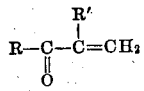

wherein R represents a radical selected from the class consisting of alkyl and aryl radicals and R' represents a member of the group consisting of hydrogen and alkyl radicals, said co-polymer containing between 58 and 63 per cent by weight of the ketone chemically combined therein.

4. The co-polymer claimed in claim 3 when compounded with usual rubber-compounding agents and vulcanized.

5. A rubber-like material comprising as the essential ingredient a co-polymer of at least one readily polymerizable conjugated aliphatic diolefine having at least four and less than six carbon atoms in the molecule and a polymerizable unsaturated ketone having the general formula:

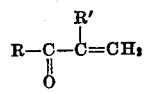

wherein R represents a radical selected from the class consisting of alkyl and aryl radicals and R' represents a member of the group consisting of hydrogen and alkyl radicals, said co-polymer containing in chemically combined form between 58 and 63 per cent by weight of the ketone.

6. A rubber-like co-polymer of butadiene-1.3 and an unsaturated ketone having the general formula:

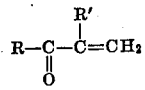

wherein R represents a radical selected from the class consisting of alkyl and aryl radicals and R' represents a member of the group consisting of hydrogen and alkyl radicals, said co-polymer containing in chemically combined form between 58 and 63 per cent by weight of the ketone.

7. A rubber-like co-polymer of butadiene-1.3 and a liquid unsaturated ketone having the general formula:

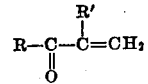

wherein R represents an alkyl radical and R' represents a member of the group consisting of hydrogen and alkyl radicals, said co-polymer containing in chemically combined form between 58 and 63 per cent by weight of the ketone.

8. A rubber-like co-polymer of butadiene-1.3 and methyl isopropenyl ketone containing in chemically combined form between 58 and 63 per cent by weight of the ketone.

9. The co-polymer claimed in claim 8 when compounded with usual rubber-compounding agents and vulcanized.

10. A rubber-like co-polymer of isoprene and an unsaturated ketone having the general formula:

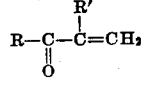

wherein R represents a radical selected from the class consisting of alkyl and aryl radicals and R' represents a member of the group consisting of hydrogen and alkyl radicals, said co-polymer containing in chemically combined form between 58 and 63 per cent by weight of the ketone.

11. A rubber-like co-polymer of isoprene and an unsaturated ketone having the general formula:

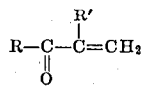

wherein R represents an alkyl radical and R' represents a member of the group consisting of hydrogen and alkyl radicals, said co-polymer containing in chemically combined form between 58 and 63 per cent by weight of the ketone.

12. A rubber-like co-polymer of isoprene and methyl isopropenyl ketone containing in chemically combined form between 58 and 63 per cent by weight of the ketone.

13. The co-polymer claimed in claim 12, when compounded with usual rubber-compounding agents and vulcanized.

14. A rubber-like co-polymer of a conjugated diolefine and a liquid unsaturated ketone having the general formula:

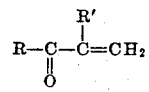

wherein R represents an alkyl radical and R' represents a member of the group consisting of hydrogen and alkyl radicals, said co-polymer containing between 58 and 63 per cent by weight of the ketone chemically combined therein.

ROBERT R. DREISBACH.